Oct. 22, 1963     R. F. STRAUSS ETAL     3,107,488
ROTATING ROCKET MOTOR
Filed Sept. 27, 1960     3 Sheets-Sheet 1
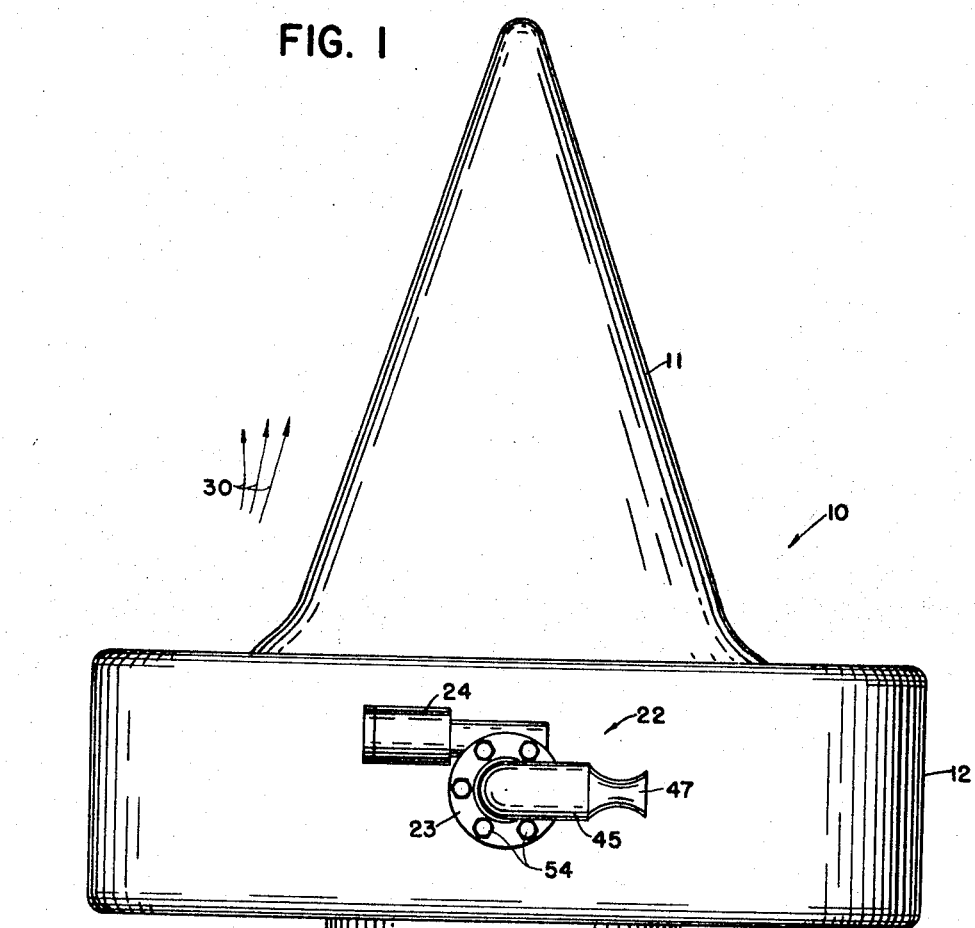
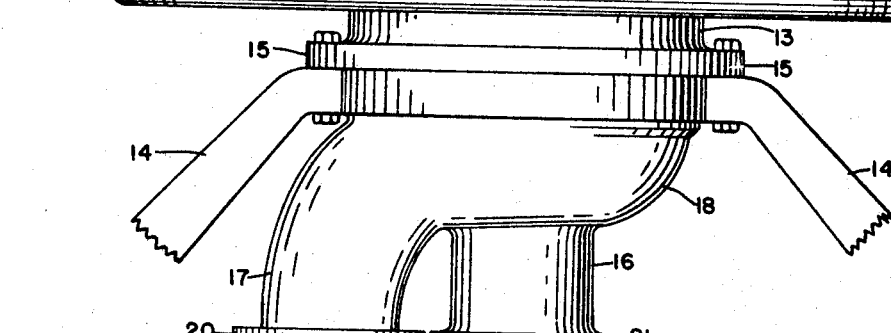
RAYMOND E. WIECH, JR.
ROBERT F. STRAUSS
INVENTORS
BY Ralph E. Bitner
ATTORNEY

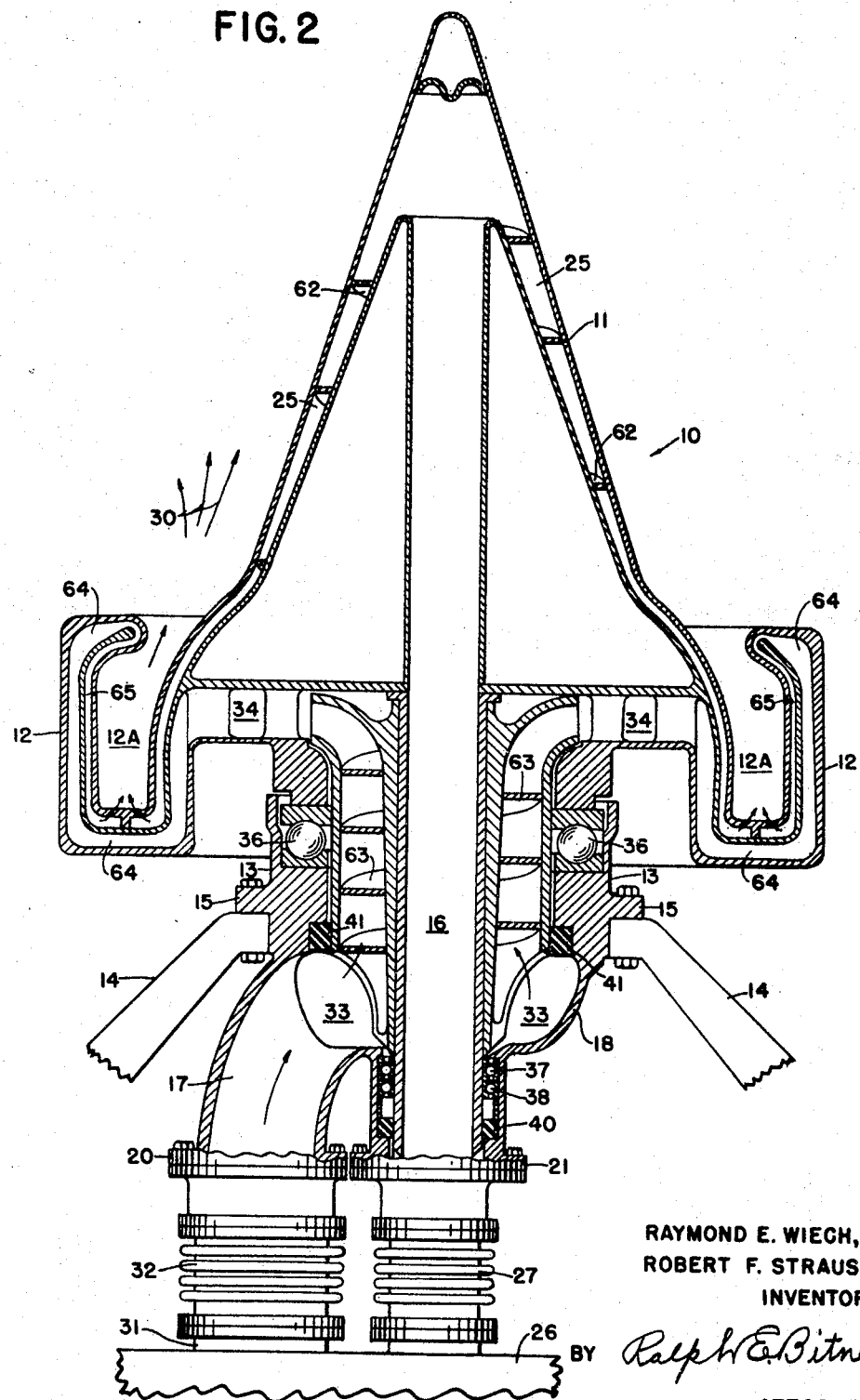

Oct. 22, 1963  R. F. STRAUSS ETAL  3,107,488
ROTATING ROCKET MOTOR
Filed Sept. 27, 1960  3 Sheets-Sheet 3

RAYMOND E. WIECH, JR.
ROBERT F. STRAUSS
INVENTORS

BY *Ralph E. Bitner*

ATTORNEY

United States Patent Office 3,107,488
Patented Oct. 22, 1963

3,107,488
ROTATING ROCKET MOTOR
Robert F. Strauss, Morris Plains, and Raymond E. Wiech, Jr., Caldwell Township, N.J., assignors to Astrosystems, Incorporated, a corporation of New Jersey
Filed Sept. 27, 1960, Ser. No. 58,770
6 Claims. (Cl. 60—35.6)

This invention relates to a rocket motor for jet propulsion of aircraft and missiles. It has particular reference to a rocket motor which revolves during its operation. The rocket is simple and contains a minimum of moving parts.

Pump fed rocket motors in use today are generally complicated because the fuel and the oxidizing agent are delivered to the combustion chamber by separate pumps which must be controlled accurately to provide the right mixture and the right weight flow. Such a system requires complicated controls which must be adjusted to each other and to the speed control. The present invention eliminates the majority of these control elements by first providing rotation of a portion of the rocket motor by two small integral jet rockets on the periphery of the main motor. The speed of rotation of the motor is controlled by turning the auxiliary jets when the speed of rotation is to be reduced. The supply of fuel and oxidizing agent is pumped into the combustion chamber by rotating vanes secured to the rotating portion of the motor. Because of the centrifugal motion, the inside walls of the motor can be reduced in thickness without sacrificing strength or rigidity.

One of the objects of this invention is to provide an improved jet motor for rockets and missiles which avoids one or more of the disadvantages and limitations of prior art arrangements.

Another object of the invention is to provide a rocket engine having only one major moving part, the engine itself.

Another object of the invention is to simplify the operation of a rocket motor by pumping both the fuel and the oxidizing agent to the combustion chamber by centrifugal type pumps.

Another object of the invention is to initiate firing of the fuel and oxidizer by means of small tangentially mounted jets.

Another object of the invention is to lighten the inside walls of the rocket engine by reinforcing the walls by pressure from the fuel pumps and by the centrifugal force provided by the engine rotation.

Another object of the invention is to prevent misalignment of thrust by rotating those parts of the engine which produce the thrust about a common axis.

Another object of the invention is to provide a reliable rocket engine with a minimum of parts.

Another object of the invention is to reduce the weight of rocket engines by at least fifty percent in comparison to prior art engines.

Another object of the invention is to simplify the control of rocket engines by providing tangential jet controls which can be varied in direction and even reversed to provide a fast deceleration and complete shut off of the pump action.

Another object of the invention is to simplify the direction of thrust of rocket motors by use of the principle of gyroscopic precession.

The invention comprises a stationary portion which includes an axial fuel line and an off-axial oxidizer line. A combustion chamber having an annular form is secured to a rotating portion of the engine which turns about the engine axis. Fuel is delivered to the combustion chamber by an annular compartment which is part of a central elongated cone. Impeller vanes are disposed within the fuel compartment for pumping the fuel. The oxidizing agent is also pumped through an annular conduit surrounding the fuel pile and through an annular chamber by means of impeller vanes.

One feature of the invention includes a plurality of small jets rotatably secured to the periphery of the engine for producing engine rotation.

Another feature of the invention includes a control means for turning the jets at various angles to control the rotation of the rocket motor.

For a better understanding of the present invention, together with other and further objects thereof, reference is made to the following description taken in connection with the accompanying drawings.

FIG. 1 is a side view of the rocket motor.

FIG. 2 is a cross sectional view of the rocket motor showing conduit connections to the fuel and oxidizer storage tanks.

FIG. 5 is an enlarged cross section of a portion of the combustion chamber showing how the fuel and oxidizer are mixed prior to ignition.

Figure 3:
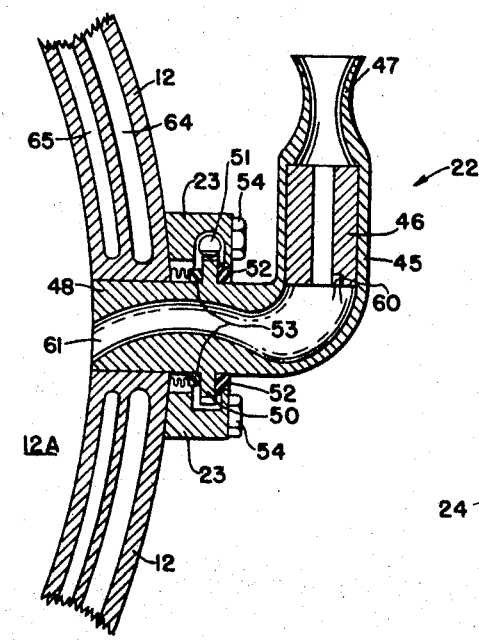
FIG. 3 is a cross sectional view of the tangent rocket motor.

Referring now to FIG. 1, the rocket motor includes a rotating portion 10 having a cone portion 11 and an annular combustion chamber 12. The rotating portion is mounted on a stationary portion 13 which is bolted to the aircraft frame by means of one or more brackets 14 secured to a mounting flange 15. Referring now to FIG. 2, the fuel passes through a conduit 16 and is pumped to the combustion chamber through an annular compartment 25 in the cone 11. The oxidizing agent is supplied through a conduit 17 which communicates with an annular chamber 18 surrounding the fuel conduit 16. The fuel and oxidizer conduits are terminated by flanges 20 and 21 which are bolted to other conduits leading through valves (not shown), to storage tanks. FIG. 1 also shows the small jet rockets 22 secured to the periphery of the combustion chamber 12.

Figure 4:
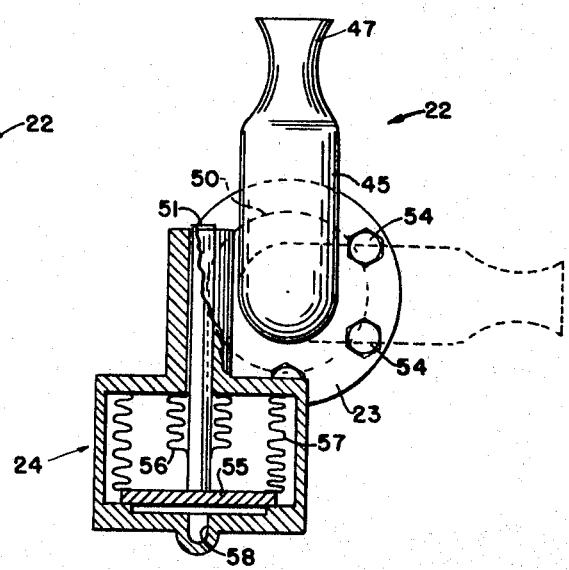
FIG. 4 is a side view of the tangent rocket motor shown in FIG. 3 with cross sectional details showing how the angular position of the rocket may be controlled by a pressure line and rack.

The jet rockets 22 are secured to the combustion chamber 12 by means of a rotatable mount 23 and are turned by a control means 24. Details of this mechanism are shown in FIGS. 3 and 4 and will be described later. The cone 11 contains an annular compartment 25 which communicates with the fuel pipe 16 and reverses the flow of fuel so that it proceeds toward the combustion chamber 12A. The fuel proceeds from a storage tank 26 through a first coupling conduit 27 and then into the conduit 16. During this preliminary period the fuel is quite cold and as it is reversed in direction and flows through the annular space 25 it cools the outer wall of the cone 11 and in doing so absorbs considerable heat. The fuel then continues to a plurality of small jets 28 shown in greater detail in FIG. 5. As the fuel emerges through the jet holes it is mixed with the oxidizer fluid and the mixture is ignited by a backward moving portion of the burning fuel in the jet rockets 22. The jet rockets 22 are always in operation turning the motor on its axis and these jets are turned on first when the motor is started before the main fuel supply is open. The flame resulting from the burning of the fuel and oxidizer emerges through the throat of the combustion chamber 12A and spreads out along the wall of the cone 11 in the general direction as indicated by the arrows 30.

The oxidizer is fed through a conduit 31 connected to an oxidizer tank and is guided through coupling pipe 32 to conduit 17 where the oxidizer is fed into annular chambers 33 and 18 positioned around the central fuel conduit 16. The oxidizer is then forced axially as shown in FIGS. 1 and 2 by means of a plurality of revolving pump vanes 63 and forced into another annular chamber 34. From here it passes around the combustion chamber where it cools a portion thereof and in turn is heated and eventually is forced through small openings 35 adjacent to openings 28 (see FIG. 5).

The rotating portion of the rocket motor is supported by a thrust bearing 36 which includes a large number of heavy balls positioned between two flat races. Another series of ball bearings 37 and 38 are mounted on the fuel conduit 16 and serve to keep the rotating portion in axial alignment. Adjoining these ball bearings is a packing 40 which prevents the fuel from leaking into other parts of the system. A similar packing ring 41 surrounds the oxidizer annular chamber 18 and prevents the oxidizer from escaping into the atmosphere.

Details of the peripheral jets 22 are shown in FIGS. 3 and 4. These jets include a housing 45 in which is positioned a hollow cylindrical mass of solid fuel 46. The usual nozzle 47 communicates with the atmosphere to expel the burning fuel and provide a small thrust for turning the movable portion of the motor. The jet 22 contains a base portion 48, provided with a gear 50 and a rack 51 cooperating with it to turn the direction of the jet when the motor rotation is being adjusted. The gear 50 is sealed from the hot gases of the combustion chamber 12A and from the ambient atmosphere by packing rings 52 and 53. The entire jet assembly is secured to the periphery of the rocket chamber 12 by means of a flange 23 secured by bolts 54.

Control power for adjusting the direction of the jet may be supplied in a number of ways. A servo motor may be used, electromagnetic controls may be arranged with magnets to change the direction, or the air pressure system shown in FIG. 4 may be employed. This system includes a piston 55 connected to the rack 51 and two bellows 56 and 57 for isolating the expansion chamber from the outside atmosphere. Pressure is transmitted to the piston face by an opening 58 which may be connected to a control means (not shown) under control of an operator.

Operation of the peripheral jets 22 is started by a small pellet 60 of pyrotechnic material which can be exploded by a pair of wires connected to a resistance wire embedded within the material. When this pellet is exploded or burned, the solid fuel 46 ignites and sends combustion gases out the nozzle 47, thereby starting rotation of the rocket motor. Hot gases are also expelled through a conduit 61 into the combustion chamber 12A of the rocket motor. The rotation of the rocket motor by expanding gases through nozzle 47 pumps both fuel and oxidizer into the rocket motor by means of vanes 62 and 63, and the flames from the solid fuel 46 emerging through conduit 61 ignite the rocket motor fuel and oxidizer to start the motor and provide the required gas flow around the cone 11 which in turn produces thrust.

Figure 6:
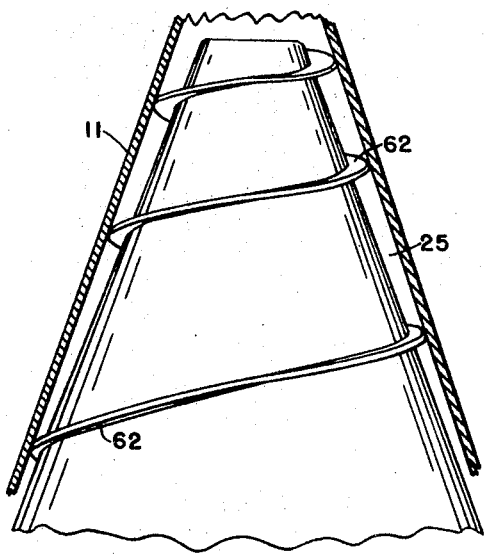
FIG. 6 is a side view of the rocket cone with the outside shell removed showing the impeller blades in this portion of the engine.
Figure 7:
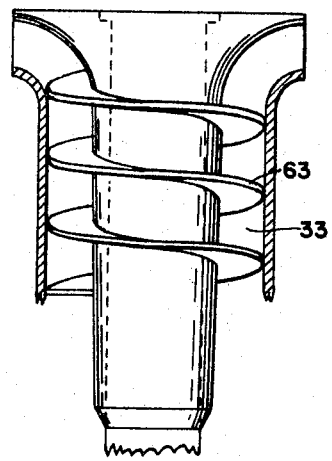
FIG. 7 is a side view of the pump blades which force the oxidizer into the combustion chamber.

When the main portion of the rocket motor revolves, pressure within tank 26 forces fuel through conduit 16 and into the cone portion 25. As shown in FIG. 6 the inside portion of the cone is provided with vanes which pump the fuel through space 25 to the holes 28 (see FIG. 5) where the fuel is ejected into space 12A for combustion. The oxidizer liquid flows through conduit 17 and into annular space 33 where the vanes 63 pump the liquid into space 34 and then around annular cavities 64 and 65 to orifices 35 for ejection into the combustion space 12A.

From the above description it will be evident that a rocket motor with a single major moving part can be operated to pump its own fuel, pump its own oxidizing liquid, permit easy control, and provide a high power thrust for the jet propulsion of space missiles.

The foregoing disclosure and drawings are merely illustrative of the principles of this invention and are not to be interpreted in a limiting sense. The only limitations are to be determined from the scope of the appended claims.

We claim:

1. A rotating rocket motor for producing a thrust caused by the combustion of liquid fuel and a liquid oxidizer comprising; a central conduit connected to a first source of supply for conveying liquid fuel to the motor; an annular conduit surrounding said central conduit and connected to a second source of supply for conveying liquid oxidizing fluid to the motor; a rotatable cone mounted in axial alignment with said central conduit for directing the products of combustion in an axial direction; an annular combustion chamber in axial alignment with the cone where the fuel and oxidizing fluid are burned, said combustion chamber positioned adjacent to the base of said cone and having an annular flange in spaced relation to the outer surface of the cone, thereby forming a constricted throat for the escape of the products of combustion; means for rotating said cone, combustion chamber, and annular conduit about the cone axis; said means including a plurality of auxiliary jets mounted on the outside surface of the combustion chamber and directed in a general tangential direction, the direction of said jets controlled by remote means to vary the speed of revolution of the combustion chamber; and pumping means for transmitting the liquid fuel and liquid oxidizer through said conduits.

2. A rotating rocket motor for producing a thrust caused by the combustion of liquid fuel and a liquid oxidizer comprising; a central conduit connected to a first source of supply for conveying liquid fuel to the motor; an annular conduit surrounding said central conduit and connected to a second source of supply for conveying liquid oxidizing fluid to the motor; a rotatable cone mounted in axial alignment with said central conduit for directing the products of combustion in an axial direction; an annular combustion chamber in axial alignment with the cone where the fuel and oxidizing fluid are burned, said combustion chamber positioned adjacent to the base of said cone and having an annular flange in spaced relation to the outer surface of the cone; thereby forming a constricted throat for the escape of the products of combustion; means for rotating said cone, combustion chamber, and annular conduit about the cone axis; said means including a plurality of auxiliary jets mounted on the outside surface of the combustion chamber and directed in a general tangential direction, the direction of said jets controlled by remote means to vary the speed of revolution of the combustion chamber; a plurality of vanes positioned within the annular conduit for pumping the oxidizing fluid into the combustion chamber; and a plurality of vanes positioned within an annular compartment in the cone for pumping liquid fuel to the combustion chamber.

3. A motor as claimed in claim 2 wherein said auxiliary jets include a conduit which connects the combustion chamber of the motor and the combustion chamber of the auxiliary jet for starting combustion in the rocket motor chamber.

4. A motor as claimed in claim 2 wherein said auxiliary jets are provided with solid fuel and are started by burning a detonating charge positioned adjoining the solid fuel.

5. A motor as claimed in claim 2 wherein the angular position of the auxiliary jets is adjusted by means of fluid pressure acting through a piston and a mechanical coupling means.

6. A motor as claimed in claim 2 wherein the annular spaces which convey the liquid fuel and the liquid oxidizer adjoin each other in the walls of said combustion chamber.

References Cited in the file of this patent

UNITED STATES PATENTS

| | | |
|---|---|---|
| 2,356,746 | Boushey | Aug. 29, 1944 |
| 2,523,655 | Goddard | Sept. 26, 1950 |
| 2,526,224 | Goddard | Oct. 17, 1950 |
| 2,555,081 | Goddard | May 29, 1951 |
| 2,637,973 | Lawrence | May 12, 1953 |
| 2,831,320 | Duncan | Apr. 22, 1958 |

FOREIGN PATENTS

| | | |
|---|---|---|
| 1,229,596 | France | Mar. 21, 1960 |
| 1,230,372 | France | Mar. 28, 1960 |